Feb. 20, 1923. 1,445,963.

W. D. LA BATT ET AL.
TESTING MACHINE.
FILED NOV. 18, 1921.

Witness:
Richard J. Jacker

Inventors:
W. D. La Batt
and Nans Ingebusch
By J. M. Roberts
Their Atty.

Patented Feb. 20, 1923.

1,445,963

UNITED STATES PATENT OFFICE.

WILLIAM D. LA BATT AND HANS SENGEBUSCH, OF CHICAGO, ILLINOIS, ASSIGNORS TO ELISHA J. CADY, OF OAK PARK, ILLINOIS.

TESTING MACHINE.

Application filed November 18, 1921. Serial No. 516,029.

*To all whom it may concern:*

Be it known that we, WILLIAM D. LA BATT and HANS SENGEBUSCH, citizens of the United States, residing at Chicago, in the county of Cook and State of Illinois, having jointly invented certain new and useful Improvements in Testing Machines, do hereby declare that the following is a full, clear, and exact description of the same, reference being had to the accompanying drawings.

The invention relates to certain new and useful improvements in machines for testing the crushing strength or resistance of corrugated paper board, such as single or multiple ply boards, and particularly to an attachment by which machines used for testing the tensile strength of sheet materials, such as paper board, may also be used for making such crushing tests, and its primary object is to provide improved means for holding the stock in place and transmitting to the stock the pressure of the elastic diaphragm when it is expanded by the liquid compressed against it by the piston. Other objects and advantages are attained as will be manifest from the disclosure.

Machines for testing the strength of paper board of the type in which the strain of a body of liquid under pressure is exerted against an elastic diaphragm acting in a transverse direction against a confined section or area of the stock, have heretofore been used for determining the tensile strength of the material, but have not heretofore been adapted so far as we are aware to test the crushing strength or resistance of corrugated paper board. Our invention consists in the matters hereinafter described and then pointed out in the appended claims by which machines of this general type may be utilized for crushing tests, and particularly by which the same machine may be used for both classes of tests.

Figure 1:
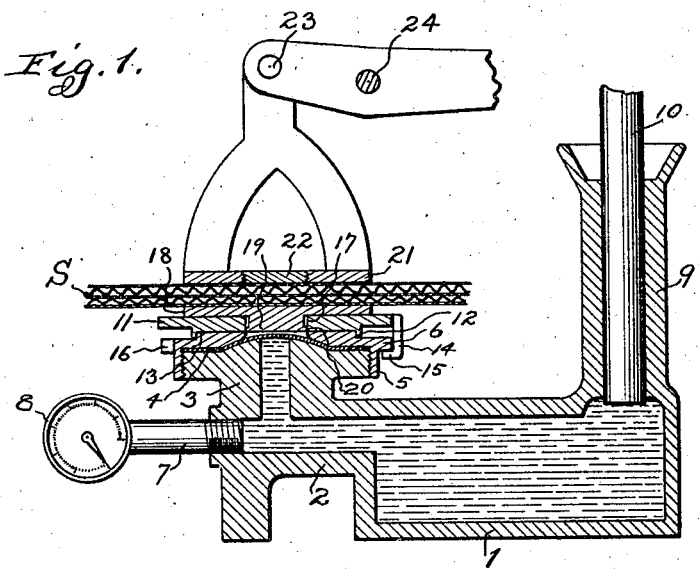
Figure 2:
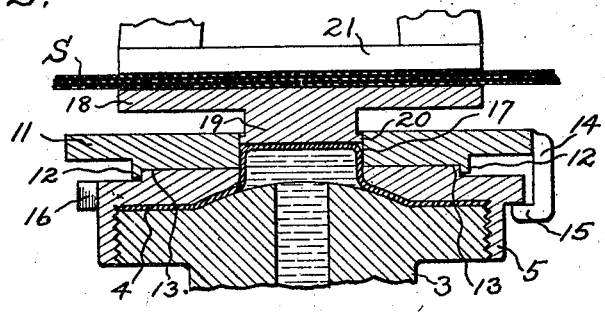
Figure 3:
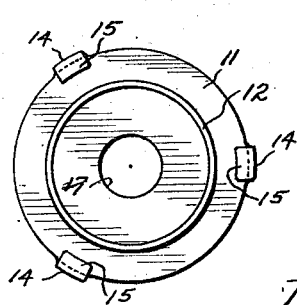

In the drawings Fig. 1 is a view partly in side elevation and partly in section showing a testing machine equipped with our invention, with a sample of two ply paper board in position; Fig. 2 is a view showing the position of the parts when a crushing test is completed, and Fig. 3 is a bottom plan view of the attachment that in practice is secured to the stock-supporting platform of a tensile-testing machine to transform it into a crushing-testing machine.

In the drawings the reference numeral 1 represents the liquid chamber of the machine, and 2 a cylinder communicating with the chamber in any suitable manner and centrally bored throughout its length, with one end upturned as shown to form a vertical branch 3 which is closed by the diaphragm 4 of elastic material as now well-understood in the art. The vertical branch is threaded to receive a cap 5 which holds the diaphragm in position and forms a stock-supporting platform, the cap being provided with a central opening or mouth in line with the bore of the branch 3 and with an overhanging top flange 6. The free end of the cylinder also receives a pipe 7 in extension of its bore and communicating with an indicating and registering gage 8 subject to and operated by the pressure of the fluid in the chamber and indicating the pressure by its pointer on its dial in pounds and fractions thereof in the usual manner. The opposite end of the chamber is provided with a piston bearing 9 in which the lower end of the piston 10 reciprocates. The parts so far described are typical of tensile or rupture testing machines and may be of any suitable construction and organization, though for purposes of practical use we prefer to make them as shown and as parts of the complete machine disclosed in our co-pending application filed August 13, 1921, Serial Number 492,007.

A plate 11 fits upon the cap, a centering annular flange 12 on the bottom of the plate surrounding an annular ledge 13 on the top face of the cap, and the plate is held or locked upon the cap by any suitable means, such for example as the depending lugs 14 having inwardly directed wings 15 to pass down through vertical slots or mortises 16 in the periphery of the cap and take under its lower edge when the plate is partly revolved on the cap. The plate is provided with a central opening or passage 17 of substantially the same diameter as and in register with the mouth of the cap 5. A movable jaw 18 above the plate 11 is provided with a depending central stem or plug 19 fitting movably into the opening 17; the stem fills the opening and in order to enable it to move with a minimum of friction it is smaller in cross-sectional area than the opening and is provided at its lower end with an annular lip 20 making a sliding fit therewith. The stem is longer than the maximum thickness of the stock to be tested; for example, if the latter is composed of three plies or walls the stem is longer than this thickness in order that it will not be raised out of the opening 17 when the stock is crushed so that it affords resistance to the diaphragm when the test is completed and the diaphragm upon being distended to the limit necessary to complete the test by the stock-rupturing liquid under compression by the plunger cannot pass out of the opening but is confined therein.

Above the jaw 18 is located a presser-foot or clamp 21 against which the jaw crushes the stock; the foot is of the same dimensions or area as the jaw and is either a solid face of metal or is composed of an outer annular portion having a temporary filler-piece 22 centrally attached thereto. The foot is movably supported and in the present instance is shown mounted upon the free end of a lever 23 pivoted at 24 and held in position to form an anvil against the top of the stock by any suitable means, preferably as shown in said co-pending application.

When the machine is at rest before making a crushing test the piston is withdrawn from the liquid in the cylinder and the parts are in the positions shown in Fig. 1, with a piece of stock S to be tested in position on the jaw 18. The presser foot is then moved down against the stock and held in its position, and the piston is moved down into the liquid in the cylinder to displace it and force it in the bore 3 to distend the diaphragm upwardly and raise the jaw 18 against that portion of the stock lying between it and the anvil formed by the now immovable foot 21, the pressure being continued until the corrugations of the stock collapse as shown in Fig. 2 and the gage registering the exact amount of pressure existing at the moment the stock is crushed.

While the jaw 18 and its attaching plate may be mounted as a permanent part of the machine, and the anvil 21 may be permanently utilized with its surface corresponding in area with the jaw, it is obvious that by making the jaw attachable and detachable and by making the anvil with a central removable section these parts may constitute an attachment capable of temporary association with the other parts, and when such attachment is dissociated or removed the machine may operate to test the tensile or rupture strength of the stock. The diameter of the jaw 18 is sufficiently greater than that of the ledge 13 to provide that when the crushing test is finished the area of the portion of the stock crushed between the jaw and the anvil will be larger than the area of the ledge so that the crushed portion will seat on the ledge to make a pop or rupture test of it by the machine after the crushing attachment is removed. In practice the area of the mouth of the cap 5 and of the passage 17 in the plate 11 is equal to one (1) square inch and the area of the jaw 18 is equal to ten (10) square inches in order to calibrate with the gage 8 which in this class of machines reads in pounds per square inch; for example, if the gage registers 280 pounds the resistance per square inch in the stock being crushed equals 28 pounds.

We claim:

1. In a machine for testing paper or other fabrics, a compression chamber containing a liquid and having an open end, an expansible diaphragm closing said end, an apertured plate secured above the diaphragm, a jaw having a stem longer than the thickness of the stock and movably fitting in the aperture of the plate in the path of the diaphragm, and an anvil above the jaw.

2. In a machine for testing paper or other fabrics, a compression chamber containing a liquid and having an open end, an expansible diaphragm closing said end, a diaphragm-cap having a mouth in line with the open end, an apertured plate removably secured to the cap, a jaw having a stem movably fitting in the aperture of the plate in the path of the diaphragm, the stem being longer than the thickness of the stock, and an anvil above the jaw.

3. In a machine for testing paper or other fabrics, a compression chamber containing a liquid and having an open end, an expansible diaphragm closing said end, a diaphragm-cap having a mouth alined with the open end and an annular groove on its upper surface, a plate removably secured to the cap and having a centering flange fitting the groove and an aperture in line with the mouth of the cap, a jaw having a stem longer than the thickness of the stock and movably fitting in the aperture of the plate in the path of the diaphragm, and an anvil above the jaw.

4. In a machine for testing paper or other fabrics, a compression chamber containing a liquid and having an open end, an expansible diaphragm closing said end, a diaphragm-cap having a mouth alined with the open end and an annular groove in its upper surface, a peripheral flange on the cap having vertical slots, a plate having a centering flange fitting the groove and an aperture in line with the mouth of the cap, lugs on the plate having ears constructed to pass through the cap-slots and engage the cap-flange, a jaw having a stem longer than the thickness of the stock and movably fitting in the aperture of the plate in the path of the diaphragm, and an anvil above the jaw.

5. In a machine for testing paper or other fabrics, a compression chamber containing a liquid and having an open end, an expansible diaphragm closing said end, an apertured plate above the diaphragm and having a ledge about its aperture, a jaw having a diameter greater than that of the ledge and provided with a stem longer than the thickness of the stock and movably fitting in the aperture of the plate in the path of the diaphragm, and an anvil above the jaw of substantially the same diameter therewith.

In testimony whereof we affix our signatures.

WILLIAM D. LA BATT.
HANS SENGEBUSCH.